July 26, 1927.
K. C. TOMLINSON
INDEX GLASS INCLOSURE
Filed Nov. 17, 1926
1,637,093
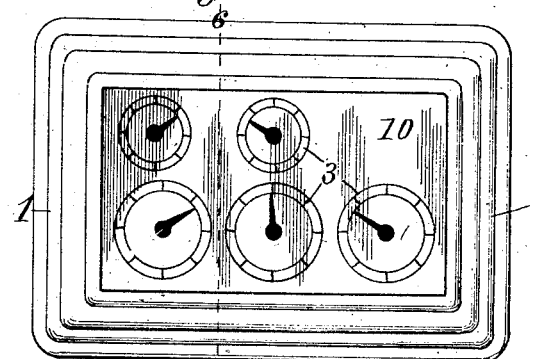
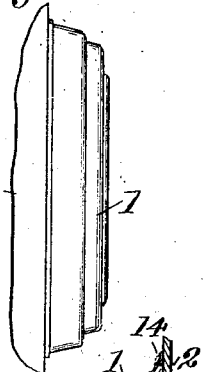
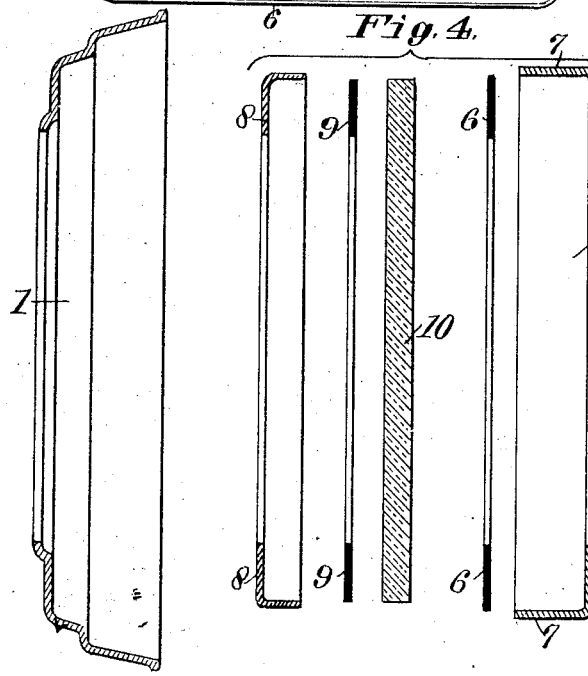
Inventor.
Kenneth C. Tomlinson
By Harry F. Totten
Attorney Patented July 26, 1927.

1,637,093

UNITED STATES PATENT OFFICE.

KENNETH C. TOMLINSON, OF BERKELEY, CALIFORNIA, ASSIGNOR TO AMERICAN METER COMPANY, INC., OF NEW YORK, N. Y., A CORPORATION OF DELAWARE.

INDEX-GLASS INCLOSURE.

Application filed November 17, 1926. Serial No. 148,947.

The present invention relates to an improved index box inclosure for meters generally and more particularly designed for gas meters as at present universally used.

The index box inclosures which are in use at the present time have the index glass held in position within the index frame and sealed against escaping gas by means of putty. This means of sealing the glass, while at first satisfactory, in time hardens and cracks thus allowing any gas leakage within the meter to escape, which leakage is very undesirable and causes many complaints from users of the meters. It is therefore the object of the invention to overcome the foregoing disadvantage and to provide an index glass inclosure which will preclude the escape of gas emanating from the stuffing boxes within the meter.

With the above and other objects in view the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit of sacrificing any of the advantages of the invention.

To comprehend the invention, reference is directed to the accompanying drawings wherein:—

Figure 1 is a front elevation showing the index box frame with the index glass inclosure positioned therein.

Figure 2 is an end elevation of the same.

Figure 3 is an enlarged vertical sectional view of the index box frame.

Figure 4 is an enlarged vertical sectional view of the parts which constitute the index glass inclosure.

Figure 5 is an enlarged vertical section showing the index glass inclosure in assembled position.

Figure 6 is an enlarged vertical sectional view taken on line 6—6 of Figure 1.

In the drawings wherein like characters of reference designate corresponding parts, the numeral 1 indicates a metallic index box frame, adapted for positioning upon the face of the meter box 2 in front of the index dials 3, and attached thereto by solder or other suitable means. Positioned within the index box frame is an index glass inclosure 4, constructed and held within said frame in the following manner. 5 is a sealing frame, having a gasket 6 of any suitable resilient material positioned therein, the peripheral edges of said frame 5 being flanged as at 7. 8 is a metallic seating angle-frame adapted to receive a gasket 9 and an index glass 10, positioned upon the gasket 9, said seating frame 8 being smaller than the frame 5 and adapted to be fitted within the sealing frame 5. The flanged portion 7 of the sealing frame is of a length sufficient to extend beyond the rear of the seating angle-frame 8 when the same is fitted within the sealing frame 5, to allow said flanged portions to be crimped or rolled over the back of the seating frame as shown at 11 in Figure 5, thus producing a leak proof index glass inclosure 4. The index glass inclosure 4 is placed within the index box frame 1 as shown in Figure 6. Any suitable means may be employed, such as solder 13, to peripherally seal the index glass inclosure 4 within the index box frame 1, which, when so sealed becomes integral therewith, as shown in Figure 6 of the drawings, thus preventing air from escaping between the peripheral edge of the inclosure 4 and the index box frame 1.

The index box frame, with the index glass inclosure sealed therein is positioned over the face of the index dials 3 and sealed in position upon the meter box 2 by solder 14 or other suitable means.

Hence from the above construction it will be seen that any gas emanating from the stuffing boxes within the meter, or any dead air in the meter top will be retained therein and not escape around the index glass 10 or between the index glass inclosure 4 and the index box frame 1.

I claim:—

An index glass inclosure for meters comprising an index box frame; oppositely interfitting flanged frames, the flange of one frame being crimped down upon the back of the other frame; an index glass confined betwen said frames; gaskets associated with said glass and frames, and means for holding and hermetically sealing said frames with said index box frame.

In testimony whereof I have signed my name to this specification.

KENNETH C. TOMLINSON.